(12) United States Patent
Bynam et al.

(10) Patent No.: US 9,692,588 B2
(45) Date of Patent: Jun. 27, 2017

(54) SYSTEM AND METHOD FOR PERFORMING SYNCHRONIZATION AND INTERFERENCE REJECTION IN SUPER REGENERATIVE RECEIVER (SRR)

(71) Applicant: Samsung Electronics Co., Ltd., Suwon-si (KR)

(72) Inventors: Kiran Bynam, Bangalore (IN); Sujit Jos, Bangalore (IN); PS Chandrashekhar Thejaswi, Bangalore (IN); ChangSoon Park, Chungju-si (KR); Jinesh P. Nair, Bangalore (IN); Young-Jun Hong, Seoul (KR); Youngsoo Kim, Seoul (KR); Manoj Choudhary, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/204,195

(22) Filed: Jul. 7, 2016

(65) Prior Publication Data
US 2017/0012766 A1  Jan. 12, 2017

(30) Foreign Application Priority Data

Jul. 7, 2015 (IN) ............................ 3479/CHE/2015
Mar. 15, 2016 (KR) ........................ 10-2016-0031111

(51) Int. Cl.
*H04L 7/00* (2006.01)
*H04L 7/04* (2006.01)
(Continued)

(52) U.S. Cl.
CPC ............. *H04L 7/0079* (2013.01); *H04B 1/30* (2013.01); *H04L 7/041* (2013.01); *H04B 1/10* (2013.01);
(Continued)

(58) Field of Classification Search
CPC ........ H04B 1/30; H04B 1/707; H04B 1/7183; H04L 7/041; H04L 2027/0028;
(Continued)

(56) References Cited

U.S. PATENT DOCUMENTS 8,103,228 B2   1/2012 Monat et al.
2011/0274141 A1  11/2011 Jantunen et al.
(Continued)

FOREIGN PATENT DOCUMENTS

CN   101052219 A   10/2007
JP   3971409 B2   9/2007
(Continued)

OTHER PUBLICATIONS

D.S. Ravishankar, *BPSK Based Super Regenerative Receiver*, Master of Science Thesis, Delft University of Technology, Delft, Netherlands, Jul. 9, 2012.

*Primary Examiner* — Ross Varndell
(74) *Attorney, Agent, or Firm* — NSIP Law

(57) ABSTRACT

A method of performing synchronization in a super regenerative receiver (SRR) includes setting a quench rate of the SRR to a value of 1.5 times a chip rate of an incoming signal, acquiring an expected preamble sequence of an arbitrary sample set among a plurality of possible sample sets, acquiring an expected start frame delimiter (SFD) sequence for all of the possible sample sets to achieve frame synchronization, computing respective correlation metrics for bits of the expected SFD sequence while the expected SFD sequence is acquired for all of the possible sample sets, calculating a decision metric based on the correlation metrics in response to an SFD sequence being detected for one or more of the possible sample sets, and identifying a best sample set for
(Continued)

demodulating the incoming signal among all of the possible sample sets based on the decision metric to achieve pulse synchronization.

20 Claims, 11 Drawing Sheets

(51) Int. Cl.

| | | |
|---|---|---|
| *H04B 1/30* | (2006.01) | |
| *H04B 1/10* | (2006.01) | |
| *H04L 27/06* | (2006.01) | |
| *H04L 27/00* | (2006.01) | |
| *H04L 7/033* | (2006.01) | |
| *H04B 1/707* | (2011.01) | |
| *H04B 1/7183* | (2011.01) | |
| *H04L 25/00* | (2006.01) | |

(52) U.S. Cl.
CPC ............ *H04B 1/707* (2013.01); *H04B 1/7183* (2013.01); *H04L 7/0033* (2013.01); *H04L 7/033* (2013.01); *H04L 25/00* (2013.01); *H04L 27/0014* (2013.01); *H04L 27/06* (2013.01); *H04L 27/063* (2013.01); *H04L 2027/0028* (2013.01); *H04L 2027/0067* (2013.01)

(58) Field of Classification Search
CPC ............ H04L 2027/0067; H04L 25/00; H04L 27/0014; H04L 27/06; H04L 27/063; H04L 7/0033; H04L 7/033
See application file for complete search history.

(56) References Cited

U.S. PATENT DOCUMENTS

| | | | |
|---|---|---|---|
| 2014/0105344 A1* | 4/2014 | Chakraborty | .......... H03D 11/06 375/371 |
| 2014/0119477 A1* | 5/2014 | Hong | ...................... H04L 27/06 375/340 |

FOREIGN PATENT DOCUMENTS

| | | |
|---|---|---|
| KR | 89-003760 B1 | 10/1989 |
| KR | 10-0665330 B1 | 1/2007 |
| KR | 10-2014-0046974 A | 4/2014 |
| KR | 10-2014-0052809 A | 5/2014 |

* cited by examiner $S_0, S_1$ - Sample set 1
$S_0, S_2$ - Sample set 2
$S_1, S_2$ - Sample set 3

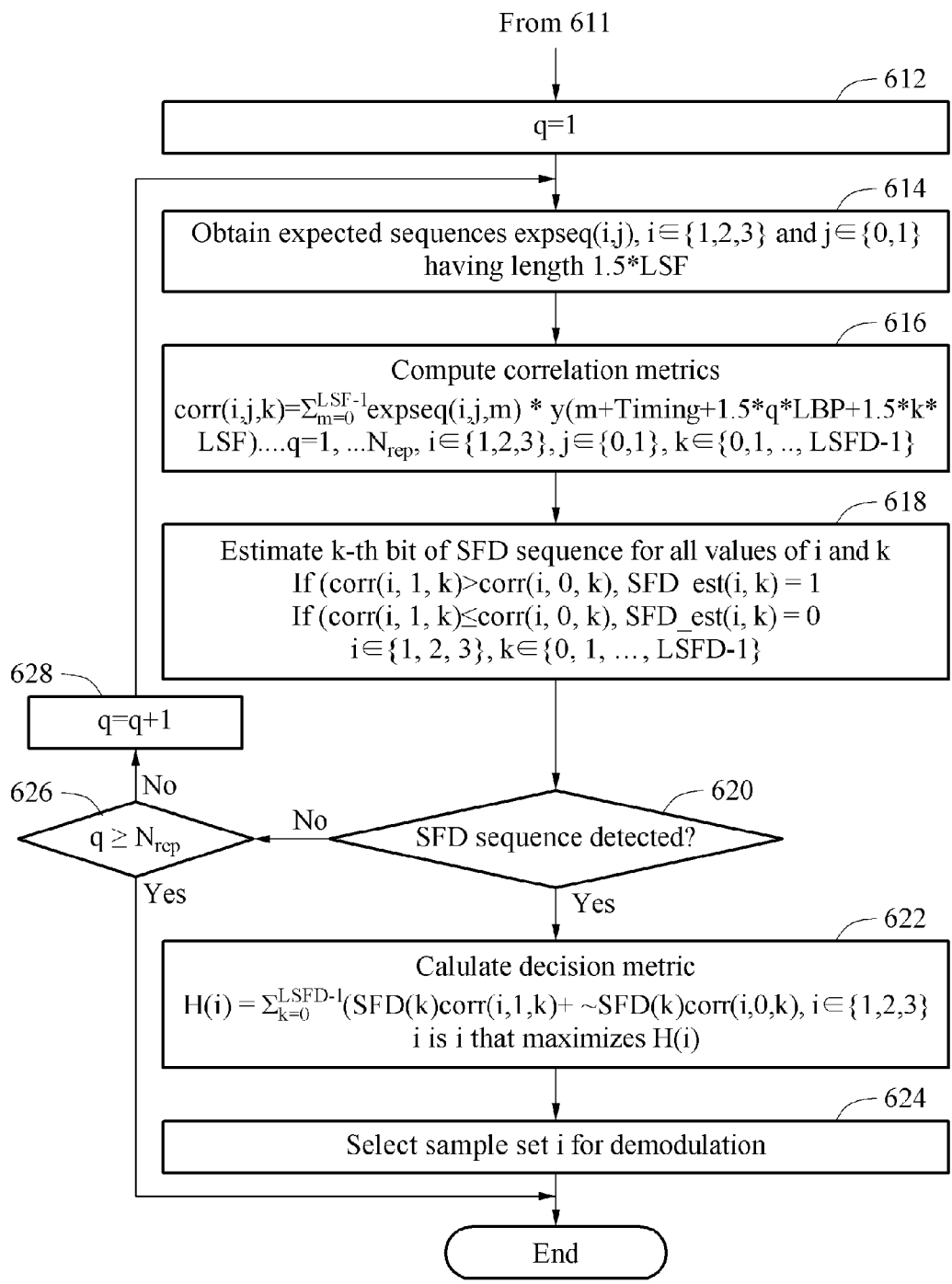

SYSTEM AND METHOD FOR PERFORMING SYNCHRONIZATION AND INTERFERENCE REJECTION IN SUPER REGENERATIVE RECEIVER (SRR)

CROSS REFERENCE TO RELATED APPLICATIONS

This application claims the benefit under 35 USC 119(a) of Indian Patent Application No. 3479/CHE/2015 filed on Jul. 7, 2015, in the Indian Patent Office, and Korean Patent Application No. 10-2016-0031111 filed on Mar. 15, 2016, in the Korean Intellectual Property Office, the entire disclosures of which are incorporated herein by reference for all purposes.

BACKGROUND

1. Field

The following description relates to synchronization in a super regenerative receiver (SRR).

2. Description of Related Art

A super regenerative receiver (SRR) is a low-power receiver that may be used in wireless sensor networks. In wireless sensor networks, for example, license-free industrial, scientific, and medical radio (ISM) bands, many nodes co-exist in the same frequency band. However, such SRR-based communication nodes are affected by interference due to lower adjacent channel interference (ACI) and alternate channel interference (ALCI) rejection capabilities of the SRR.

In typical super-heterodyne or direct conversion receivers, passband signals are down-converted to an intermediate frequency or a baseband frequency using mixers and filtered in a baseband to improve an interference rejection capability. However, using a filter in an SRR has an undesirable effect on power consumption because the SRR operates at a radio frequency (RF). Moreover, there is no distinction in an output of the SRR depending on whether an input of the SRR is at a resonant frequency or at some frequency offset from the resonant frequency, which prevents an application of filtering techniques at the output of the SRR.

Another approach for to improve the interference rejection capability of the SRR uses undersampling (for example, sampling at less than 2 times a chip rate) of a signal to improve the interference rejection capability. However, the undersampling of the signal may disturb synchronization of the SRR. Furthermore, sampling of the received signal at a rate corresponding to 1.5 times the chip rate or any fractional sampling may impose certain challenges in terms of synchronization. The fractional quench rate of 1.5 times the chip rate will provide a fractional number (1.5) of samples per each chip, which indicates that, for every two chips, three samples will be available at a receiver baseband. A possible number of sets of two samples out of three samples that may represent the two chips is 3 or $$\binom{3}{2}.$$

In these three samples, there are two samples that best represent the two chips, which is a desired sample set. Identification of the desired sample set from all three possible sample sets is performed by pulse synchronization.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of performing pulse synchronization in a super regenerative receiver (SRR) includes setting a quench rate of the SRR to a value of 1.5 times a chip rate of an incoming signal; acquiring an expected preamble sequence of an arbitrary sample set among a plurality of possible sample sets; acquiring an expected start frame delimiter (SFD) sequence for all of the possible sample sets to achieve frame synchronization; computing respective correlation metrics for bits of the expected SFD sequence while the expected SFD sequence is acquired for all of the possible sample sets; calculating a decision metric based on the correlation metrics in response to an SFD sequence being detected for one or more of the possible sample sets; and identifying a best sample set for demodulating the incoming signal among all of the possible sample sets based on the decision metric to achieve pulse synchronization.

The expected preamble sequence may include a plurality of base preambles; and the method may further include correlating the incoming signal with the expected preamble sequence at 1.5 times a sampling rate or at 1.5 times the quench rate.

The may further include obtaining coarse timing synchronization by maximizing a correlation value obtained by the correlating of the incoming signal with the expected preamble sequence.

Detection of the SFD sequence may be performed after an integer multiple of a preamble length in the one or more sample sets.

The computing may include correlating the acquired expected SFD sequence with each of SFD spread sequences corresponding to "0" and "1" for all of the possible sample sets to obtain the correlation metrics.

The method may further include deciding a received bit as "0" or "1" based on a correlation of an incoming sequence of each of all of the possible sample sets with each of the SFD spread sequences corresponding to "0" and "1".

The method may further include correlating the SFD sequence detected for all of the sample sets with the expected SFD sequence to obtain correlation values; and comparing the correlation values with a threshold value.

The SFD sequence may be detected in response to at least one sample set producing at least one correlation value greater than or equal to a threshold value.

The calculating of the decision metric may include calculating the decision metric with respect to the best sample set in response to the SFD sequence being detected.

The calculating of the decision metric may further include calculating the decision metric based on the correlation metrics and the bits of the expected SFD sequence.

The identifying of the best sample set may include identifying, as the best sample set, a sample set that maximizes the decision metric among all of the possible sample sets.

In another general aspect, a non-transitory computer-readable storage medium stores instructions that, when executed by a processor, cause the processor to perform the method described above.

In another general aspect, a system for performing pulse synchronization in a super regenerative receiver (SRR) includes a processor; and a memory coupled to the processor and configured to store instructions that, when executed by the processor, cause the processor to implement a setter, an acquirer, a computer, and an identifier; wherein the setter is configured to set a quench rate of the SRR to a value of 1.5 times a chip rate of an incoming signal; the acquirer is configured to acquire an expected preamble sequence of an arbitrary sample set among a plurality of possible sample sets, and acquire an expected start frame delimiter (SFD) sequence for of the all possible sample sets to achieve frame synchronization; the computer is configured to compute respective correlation metrics for bits of the expected SFD sequence while the expected SFD sequence is acquired for all of the possible sample sets, and calculate a decision metric based on the correlation metrics in response to an SFD sequence being detected for one or more of the possible sample sets; and the identifier is configured to identify a best sample set for demodulating the incoming signal among all of the possible sample sets based on the decision metric to achieve pulse synchronization.

The expected preamble sequence may include a plurality of base preambles; and the computer may be further configured to correlate the incoming signal with the expected preamble sequence at 1.5 times a sampling rate or at 1.5 times the quench rate.

The computer may be further configured to obtain coarse timing synchronization by maximizing a correlation value obtained by the correlating of the incoming signal with the expected preamble sequence.

Detection of the SFD sequence may be performed after an integer multiple of a preamble length in the one or more sample sets.

The computer may be further configured to correlate the acquired expected SFD sequence with each of SFD spread sequences corresponding to "0" and "1" for all of the possible sample sets to obtain the correlation metrics.

The computer may be further configured to decide a received bit as "0" or "1" based on a correlation of an incoming sequence of each of all of the possible sample sets with each of the SFD spread sequences corresponding to "0" and "1".

The computer may be further configured to correlate the SFD sequence detected for all of the sample sets with the expected SFD sequence to obtain correlation values; and compare the correlation values with a threshold value.

The SFD sequence may be detected in response to at least one sample set producing at least one correlation value greater than or equal to a threshold value.

The computer may be further configured to calculate the decision metric based on the correlation metrics and the bits of the expected SFD sequence.

Other features and aspects will be apparent from the following detailed description, the drawings, and the claims.

BRIEF DESCRIPTION OF THE DRAWINGS

FIGS. 6A and 6B are flowcharts illustrating a more detailed example of a method of performing synchronization and interference rejection in an SRR.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
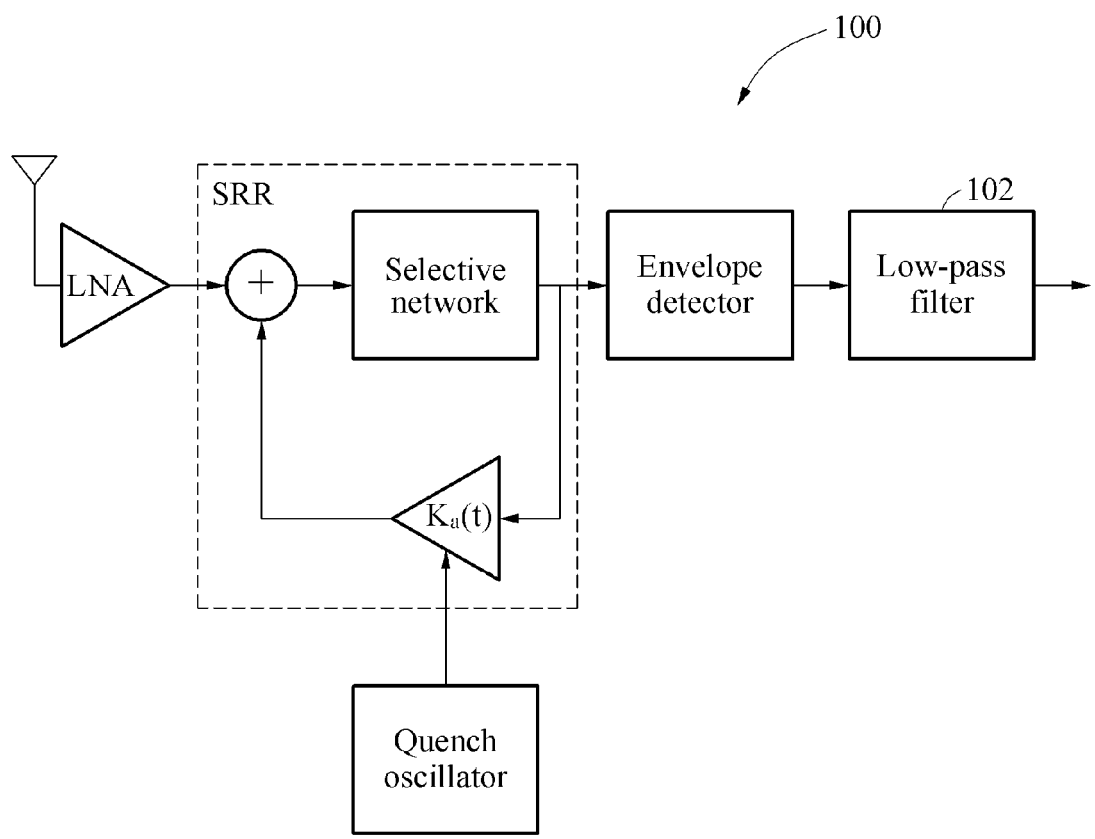
FIG. 1 is a block diagram illustrating an example of a super regenerative receiver (SRR) of the related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The examples described herein provide a system and method for performing synchronization in a super regenerative receiver (SRR). In the SRR, a quench rate is set to a predefined value, for example, a value 1.5 times a chip rate of an incoming signal. An expected preamble sequence is acquired with a predefined sample set. An expected start frame delimiter (SFD) sequence is further acquired for all possible sample sets to achieve frame synchronization. Respective correlation metrics for bits of the expected SFD sequence are computed while the expected SFD sequence is acquired for all of the possible sample sets. A decision metric is calculated based on the correlation metrics when an SFD sequence is detected for one or more sample sets. A best sample set from the one or more sample sets is identified for demodulating the incoming signal to achieve pulse synchronization.

In the SRR, a sensitivity curve is defined by $s(t)=e^{\omega_0 \int_0^t \zeta(\lambda)d\lambda}$, where $\zeta(\lambda)$ is a damping function, which in turn is a function of a quench signal.

A selectivity response of the SRR is defined by $$H(\omega) = \frac{\omega}{\omega_0} \frac{\psi(\omega - \omega_0)}{\psi(0)},$$

where $\psi(\omega) = \int_{-\infty}^{\infty} p_c(t)s(t)e^{-j\omega t}dt$.

Further, $\psi(\omega)$ may also be written as $P_c(\omega) \otimes S(\omega)$, wherein $\otimes$ denotes the integral operation indicated in the equation for $\psi(\omega)$ in the previous paragraph. Thus, a narrower selectivity response may be obtained by narrowing $S(\omega)$ for a provided pulse shape and baud rate. $S(\omega)$ and $P_c(\omega)$) are Fourier transform functions of the sensitivity curve $s(t)$ and a pulse shape $P_c(t)$ of a received signal.

For a provided baud rate, $P_c(t)$ parameters are fixed. Undersampling the signal or decreasing the quench rate results in a narrower $S(\omega)$. The narrower $S(\omega)$ results in a narrower frequency response of the SRR, which improves an interference rejection capability of the SRR.

The system and method described herein use 1.5-times oversampling rather than 3-times oversampling. In general, 3 times-oversampling is considered ideal for synchronization in presence of a pulse shape. The pulse shape may be Gaussian, raised cosine, triangular, or any other pulse shape. Furthermore, the system and the method described herein use signal spreading properties to handle synchronization when the 1.5 times oversampling is used.

FIG. 1 is a block diagram illustrating an example of an SRR of the related art. Referring to FIG. 1, an SRR 100 includes a low-pass filter 102, an envelope detector, a selective network, and a quench oscillator. Since there is no distinction in an output of the SRR 100 depending on whether an input of the SRR 100 is at a resonant frequency or some frequency offset from the resonant frequency, the low-pass filter 102 is only useful for smoothing an envelope, and cannot perform adjacent channel interference (ACI) rejection.

Figure 2:
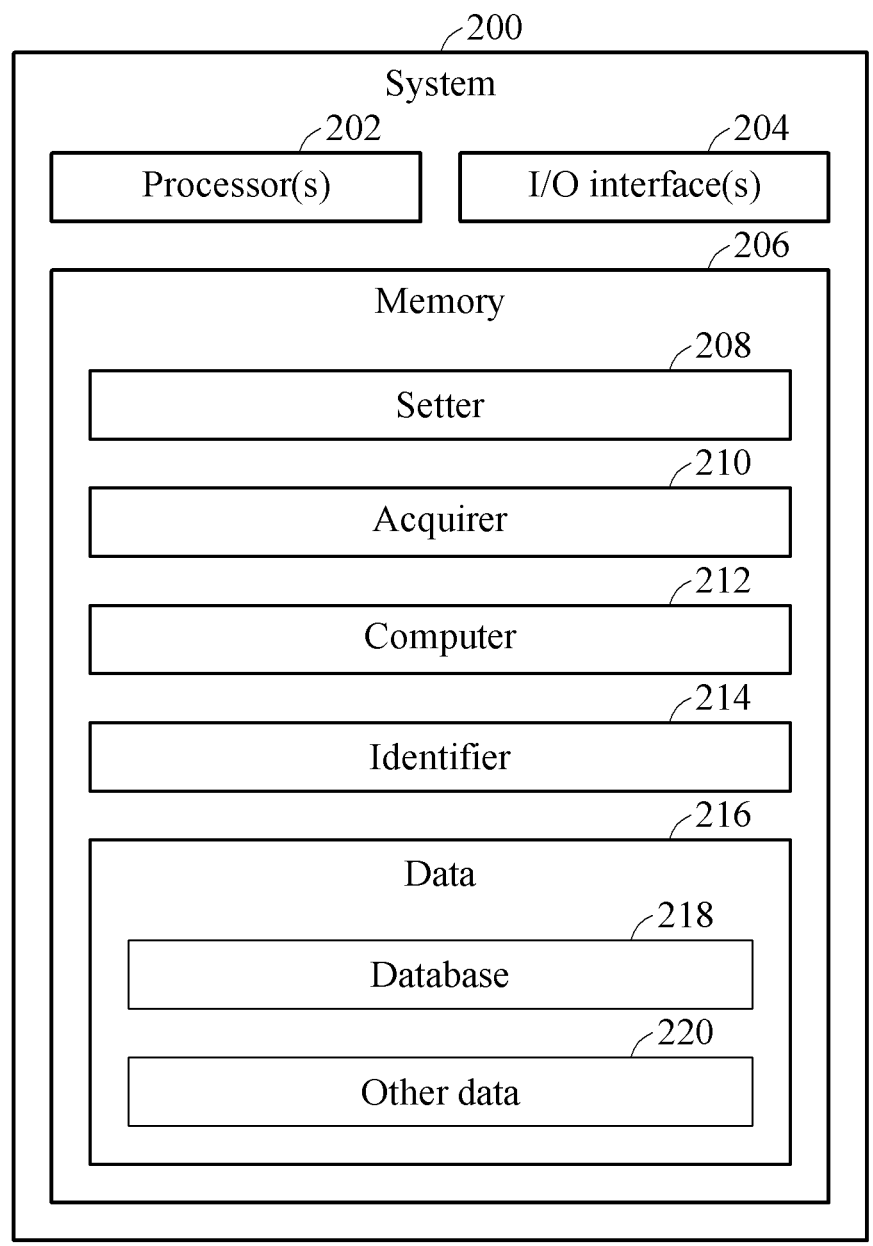
FIG. 2 is a block diagram illustrating an example of elements in a system for performing synchronization and interference rejection in an SRR.

FIG. 2 is a block diagram illustrating an example of elements in a system for performing synchronization and interference rejection in an SRR. Referring to FIG. 2, a system 200 includes at least one processor 202, at least one input/output (I/O) interface 204, for example, at least one configurable user interface, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206. The system 200 may be coupled to the SRR 100 or may be configured within the SRR 100.

The I/O interface 204 may include a variety of software and hardware interfaces, for example, a web interface, a graphical user interface, or any other I/O interface. The I/O interface 204 allows the system 200 to interact with a user directly or through client devices. Further, the I/O interface 204 enables the system 200 to communicate with other computing devices, such as web servers and external data servers (not shown). The I/O interface 204 may facilitate multiple communications within a wide variety of networks and protocol types, including wired networks, for example, a local area network (LAN), a cable, or any other wired network. The I/O interface 204 may include one or more ports to connect a number of devices to one another or to another server.

Elements include routines, programs, objects, components, data structures, and other elements that perform particular tasks or functions, or implement particular abstract data types. In the example in FIG. 2, the elements include a setter 208, an acquirer 210, a computer 212, and an identifier 214. The setter 208, the acquirer 210, the computer 212, and the identifier 214 are implemented by the at least one processor 202 executing corresponding programs or coded instructions stored in the memory 206. To represent this, FIG. 2 shows the setter 208, the acquirer 210, the computer 212, and the identifier 214 as being stored in the memory 206.

Further, data 216, among the other elements, serves as a repository configured to store data processed, received, or generated by any one or any combination of any two or more of the setter 208, the acquirer 210, the computer 212, and the identifier 214. The data 216 includes a database 218 and other data 220. The other data 220 includes data generated as a result of execution of any one or any combination of any two or more of the setter 208, the acquirer 210, the computer 212, and the identifier 214.

Figure 3A:
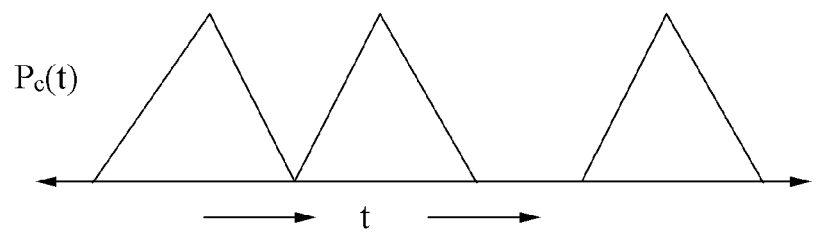
FIGS. 3A, 3B, and 3C respectively illustrate examples of a baseband pulse train, quench cycles, and sample sets produced for a number of chips.
Figure 3B:
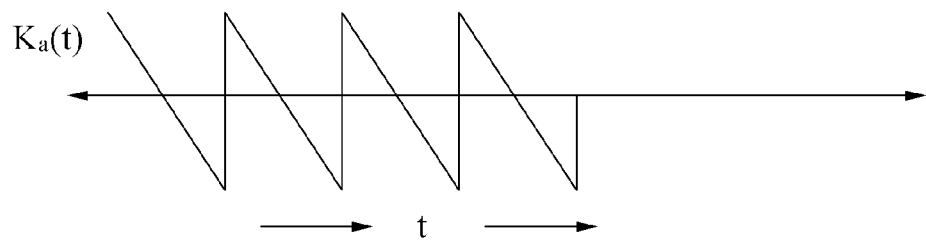
Figure 3C:
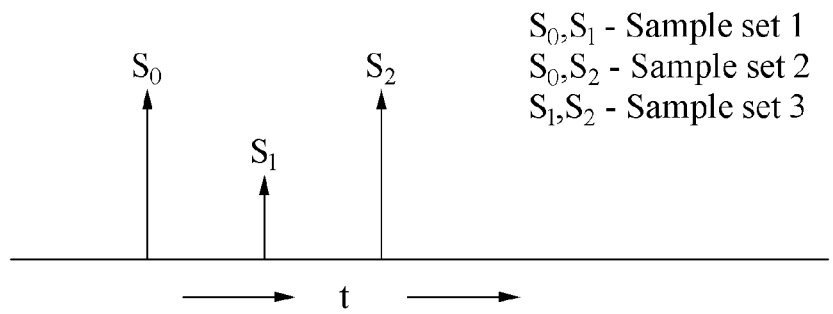

FIGS. 3A, 3B, and 3C respectively illustrate examples of a baseband pulse train, quench cycles, and sample sets produced for a number of chips. The setter 208 sets a quench rate to a predefined value of 1.5 times a chip rate, which causes three samples to be produced for every two chips. In detail, FIG. 3A shows an example of a baseband pulse train, FIG. 3B shows an example of producing a quench cycle for two chips, and FIG. 3C shows an example of possible sample sets.

When the quench rate is set to 1.5 times the chip rate by the setter 208, spreading properties of a preamble and an SFD sequence are used to handle synchronization.

When the quench rate is set, the acquirer 210 acquires an expected preamble sequence with an arbitrary sample set. The preamble includes "1"s and "0"s that respectively represent the presence and the absence of a signal.

Figure 4A:
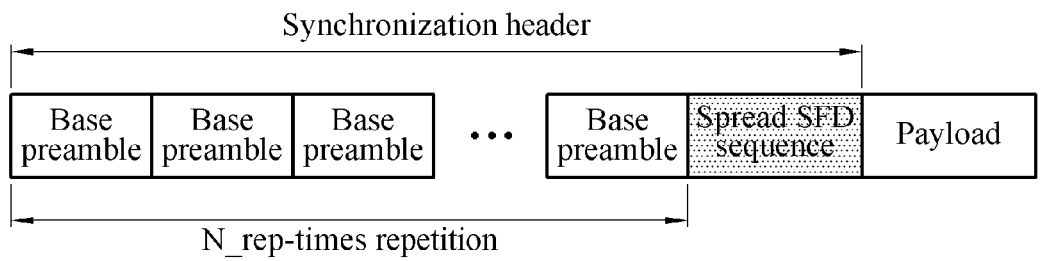
FIG. 4A illustrates an example of a synchronization header including base preambles and a spread SFD sequence, and a payload.

FIG. 4A illustrates an example of a synchronization header including base preambles and a spread SFD sequence, and a payload. Referring to FIG. 4A, the synchronization header includes a base preamble repeated $N_{rep}$ times followed by the spread SFD sequence.

Figure 4B:
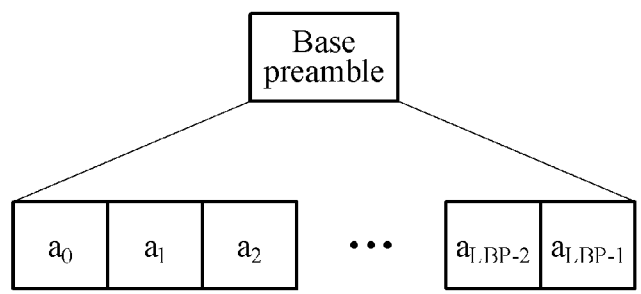
FIG. 4B illustrates an example of a base preamble including chips, $\{a_0, a_1, \ldots, a_{LBP-1}\}$, $a_n \in \{0,1\}$ having a length LBP.

FIG. 4B illustrates an example of a base preamble including chips $\{a_0, a_1, \ldots, a_{LBP-1}\}$, $a_n \in \{0,1\}$ having a length LBP. Referring to FIG. 4B, the base preamble includes a sequence chips $a_0, a_1, \ldots, a_{LBP-1}$, where $a_n \in \{0,1\}$ and is called a spread code. The quench rate is set to 1.5 times the chip rate by the setter 208. The acquirer 210 further acquires an expected SFD sequence for all possible sample sets. The expected SFD sequence is detected when every preamble length is multiplied by an integer.

Figure 4C:
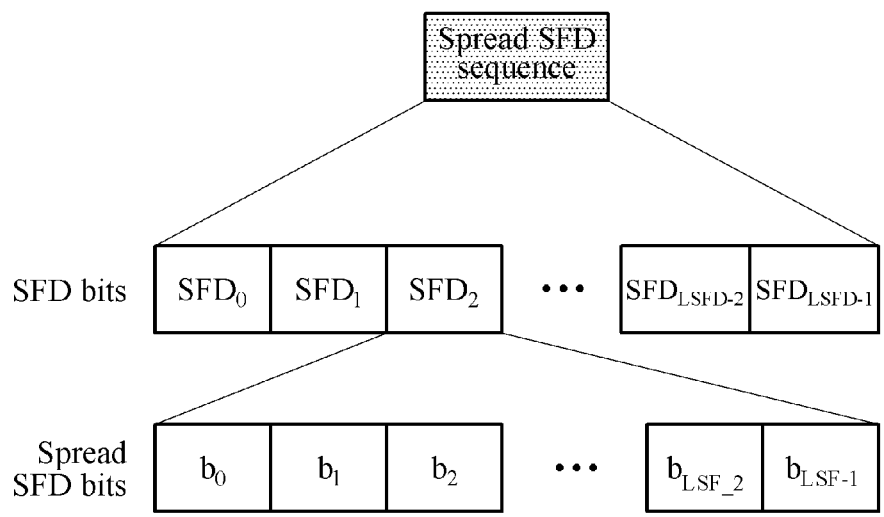
FIG. 4C illustrates an example of a structure of a spread SFD sequence including LSFD bits [$\{SFD_0, SFD_1, \ldots, SFD_{LSFD-1}\}$, $SFD_n \in \{0,1\}$].

FIG. 4C illustrates an example of a structure of a spread SFD sequence including LSFD bits $[\{SFD_0, SFD_1, \ldots, SFD_{LSFD-1}\}, SFD_n \in \{0,1\}]$. Further, FIG. 4C illustrates an example of a k-th spread bit including chips $\{b_0, b_1, \ldots, b_{LSF-1}\}$, where $b_n = SFD_k * SF_n + (1-SFD_k) * \overline{SF_n}$, $\{SF_0, SF_1, \ldots, SF_{LSF-1}\}$ is an SFD spread sequence, and $\overline{SF_n}$ is the one's complement of $SF_n$. Referring to FIG. 4C, the spread SFD sequence includes an arbitrary sequence (having a length LSFD) of "0" and "1" with good correlation properties and with each bit spreaded by the spread SFD sequence $\{SF_0, SF_1, \ldots, SF_{LSF-1}\}$, where $SF_n \in \{0,1\}$ and LSF is a length of a spread sequence used for SFD spreading.

The acquirer 210 is further configured to correlate an incoming signal with an expected preamble sequence of an arbitrary sample set at 1.5 times a sampling rate or at 1.5 times a quench rate. The acquirer 210 obtains a sample number or timing information that maximizes a correlation value.

An incoming sequence is correlated with an expected preamble sequence of an arbitrary sample set.

In one example, let incoming samples be $S_n$, n=0, 1, 2, ..., 2*LBP-1, including two base preambles.

Let an expected preamble sequence of an arbitrary sample set be as follows:

$$E_n = a^*_0, 0, a^*_1, a^*_2, 0, a^*_3, a^*_4, 0, a^*_5, a^*_6, 0, a^*_7, a^*_0, 0, a^*_1, a^*_2, 0, a^*_3, a^*_4, 0, a^*_5, a^*_6, 0, a^*_7, \text{ where}$$

$$a^*_n = 2*a_n - 1.$$

The incoming samples are correlated with the expected preamble sequence according to the following equation:

$$coarsecorr(m) = \sum_{n=0}^{2*LBP-1} S_{n+m} E_n$$

The value of m that maximizes coarsecorr provides coarse synchronization denoted by "Timing" as indicated by the following equation.

Timing=arg max{coarsecorr}

When the expected preamble sequence is acquired, the computer 212 computes respective correlation metrics for bits of the expected SFD sequence while the expected SFD sequence is acquired for all of the possible sample sets.

The computer 212 decides a received bit as "0" or "1" based on a correlation of an incoming sequence of each of all of the possible sample sets with each of SFD spread sequences corresponding to "0" and "1". The computer 212 correlates samples for each spreaded bit of the SFD sequence with each expected sample sequence corresponding to "0" and "1" for all of the sample sets. The SFD sequence detected for all of the sample sets is correlated with the expected SFD sequence. A correlation value of the detected SFD sequence and the expected SFD sequence is compared with a threshold value.

The SFD sequence is detected when at least one sample set produces at least one correlation value greater than or equal to the threshold value.

The computer 212 calculates a decision metric based on the correlation metrics when the SFD sequence is detected for one or more sample sets. The sample sets having a maximum decision metric are considered to be a best sample set or desired sample set.

The decision metric is calculated based on correlations of bits of the detected SFD sequence with the bits of the expected SFD sequence for all of the possible sample sets.

The identifier 214 is configured to identify a desired sample set or a best sample set for demodulating the incoming signal. The desired sample set is obtained by maximizing the decision metric.

A method for performing pulse synchronization is described in detail below.

In one example, the following three types of spread sequences are created for bits of an SFD sequence:

Zero insertion at the end of every pair of samples in the spread code with a first pair being the first two bits of the spread code;

Zero insertion in between the samples in every pair of samples with the first pair being the first two bits of the spread code; and Zero insertion at the beginning of every pair of samples with the first pair being the first two bits of the spread code.

In one example, let the spread SFD sequence be as follows.

$SF_0, SF_1, SF_2, \ldots, SF_{LSF-1}$ and $SF^*_n = 2SF_n - 1, SF_n \in \{0,1\}$.

A first expected spread sequence, for example, first two out of three samples selected, is as shown in Table 1 below.

TABLE 1

| Bit 1/0 | $S_0$ | $S_1$ | $S_2$ | $S_3$ | $S_4$ | $S_5$ | $S_6$ | $S_7$ | $S_8$ | $S_9$ | $S_{10}$ | $S_{11}$ |
|---|---|---|---|---|---|---|---|---|---|---|---|---|
| expseq(1, 1) [ ] | $SF_0^*$ | $SF_1^*$ | 0 | $SF_2^*$ | $SF_3^*$ | 0 | $SF_4^*$ | $SF_5^*$ | 0 | $SF_6^*$ | $SF_7^*$ | 0 |
| expseq(1, 0) [ ] | $-SF_0^*$ | $-SF_1^*$ | 0 | $-SF_2^*$ | $-SF_3^*$ | 0 | $-SF_4^*$ | $-SF_5^*$ | 0 | $-SF_6^*$ | $-SF_7^*$ | 0 |

A second expected spread sequence, for example, first and last out of three samples selected, is as shown in Table 2 below.

TABLE 2

| Bit 1/0 | $S_0$ | $S_1$ | $S_2$ | $S_3$ | $S_4$ | $S_5$ | $S_6$ | $S_7$ | $S_8$ | $S_9$ | $S_{10}$ | $S_{11}$ |
|---|---|---|---|---|---|---|---|---|---|---|---|---|
| expseq(2, 1)[ ] | $SF_0^*$ | 0 | $SF_1^*$ | $SF_2^*$ | 0 | $SF_3^*$ | $SF_4^*$ | 0 | $SF_5^*$ | $SF_6^*$ | 0 | $SF_7^*$ |
| expseq(2, 0)[ ] | $-SF_0^*$ | 0 | $-SF_1^*$ | $-SF_2^*$ | 0 | $-SF_3^*$ | $-SF_4^*$ | 0 | $-SF_5^*$ | $-SF_6^*$ | 0 | $-SF_7^*$ |

A third expected spread sequence, for example, last two out of three samples selected, is as shown in Table 3 below.

TABLE 3

| Bit 1/0 | $S_0$ | $S_1$ | $S_2$ | $S_3$ | $S_4$ | $S_5$ | $S_6$ | $S_7$ | $S_8$ | $S_9$ | $S_{10}$ | $S_{11}$ |
|---|---|---|---|---|---|---|---|---|---|---|---|---|
| expseq(3, 1)[ ] | 0 | $SF_0^*$ | $SF_1^*$ | 0 | $SF_2^*$ | $SF_3^*$ | 0 | $SF_4^*$ | $SF_5^*$ | 0 | $SF_6^*$ | $SF_7^*$ |
| expseq(3, 0)[ ] | 0 | $-SF_0^*$ | $-SF_1^*$ | 0 | $-SF_2^*$ | $-SF_3^*$ | 0 | $-SF_4^*$ | $-SF_5^*$ | 0 | $-SF_6^*$ | $-SF_7^*$ |

Let i denote the sample sequence selected, j represent "0" or "1"', k denote a bit in an SFD sequence, and y denote a received signal vector.

$$\mathrm{corr}(i,j,k) = \Sigma_{m=0}^{LSF-1} \mathrm{expseq}(i,j,m)^* y(m + \mathrm{Timing} + 1.5^* q^* \mathrm{LBP} + 1.5^* k^* \mathrm{LSF}) \ldots, q=1, \ldots, N_{rep},$$
$$i \in \{1,2,3\}, j \in \{0,1\}, k \in \{0,1,\ldots,\mathrm{LSFD}-1\}$$

$$\mathrm{SFD}_{est(i,m)} = \mathrm{corr}(i,1,k) > \mathrm{corr}(i,0,k)$$

$\mathrm{SFD}_{est(i,m)}$ is an m-th bit of an estimated SFD sequence for an i-th sample set.

A bit of an SFD sequence detected is correlated with the estimated SFD sequence to find an SFD pattern in a frame for all values of i.

$$\mathrm{corrSFD}(i) = \Sigma_{m=0}^{LSFD-1} \mathrm{SFD}_{est(i,m)} * \mathrm{SFD}(m)$$

An SFD sequence is detected when corrSFD(i) for any i is greater than or equal to a threshold value. A new decision metric is calculated based on correlated values at a point or timing in a preamble when the SFD sequence is detected to decide pulse synchronization according to the following equation, where "~" denotes a one's complement.

$$H(i) = \Sigma_{k=0}^{LSFD-1}(\mathrm{SFD}(k)^* \mathrm{corr}(i,1,k)) + (\sim \mathrm{SFD}(k)\mathrm{corr}(i,0,k))$$

In the above equation, i that maximizes H(i) provides an optimal sample sequence for detection, k denotes a bit in an SFD sequence, and i is an index of a sample set. Depending on i that maximizes H(i), two samples that most likely represent chips and may be used in detection of a payload are decided from among three samples.

Figure 5:
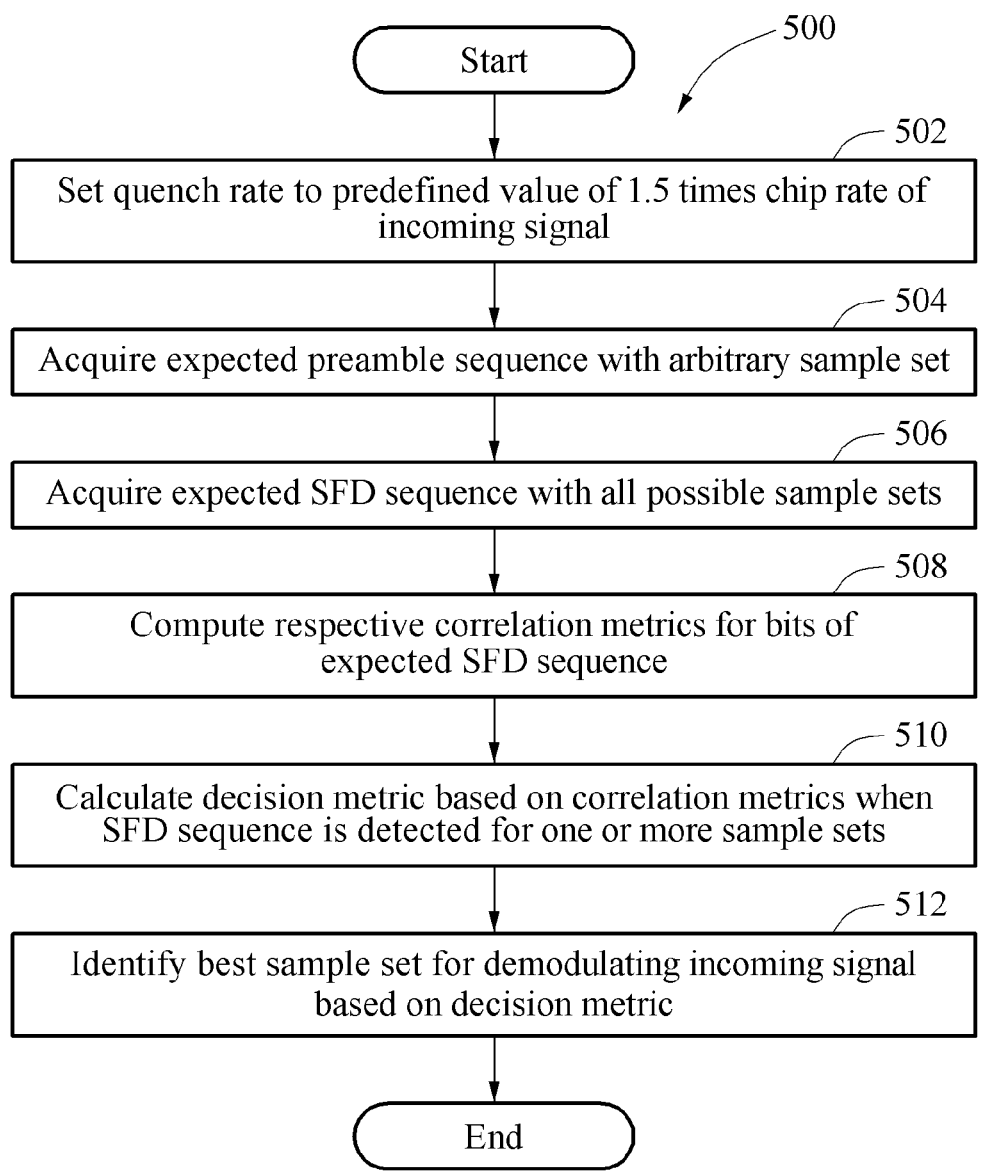
FIG. 5 is a flowchart illustrating an example of a method of performing synchronization and interference rejection in an SRR.

FIG. 5 is a flowchart illustrating an example of a method of performing synchronization and interference rejection in an SRR. Referring to FIG. 5, a method 500 of performing synchronization in the SRR 100 is illustrated. The method 500 may be performed by the system 200 in FIG. 2.

In operation 502, the method 500 sets a quench rate of the SRR 100 to a predefined value of 1.5 times a chip rate of an incoming signal. The quench rate may be set by the setter 208 in FIG. 2.

In operation 504, the method 500 acquires an expected preamble sequence with an arbitrary sample set. The acquisition may be performed by the acquirer 210 in FIG. 2.

In operation 506, the method 500 acquires an expected SFD sequence with all possible sample sets to achieve frame synchronization. The acquisition may be performed by the acquirer 210 in FIG. 2.

In operation 508, the method 500 computes respective correlation metrics for bits of the expected SFD sequence while the expected SFD sequence is acquired for all of the possible sample sets. The computation may be performed by the computer 212 in FIG. 2.

In operation 510, the method 500 calculates a decision metric based on the correlation metrics when an SFD sequence is detected for one or more sample sets. The calculation may be performed by the computer 212 in FIG. 2.

In operation 512, the method 500 identifies a best sample set for demodulating the incoming signal based on the decision metric, thereby achieving pulse synchronization. The identification may be performed by the identifier 214 in FIG. 2.

The various operations in the method 500 may be performed in the order presented, in a different order, or simultaneously. Further, in some examples, a portion of the operations may be omitted, added, modified, or skipped without departing from the scope of the disclosure.

Figure 6A:
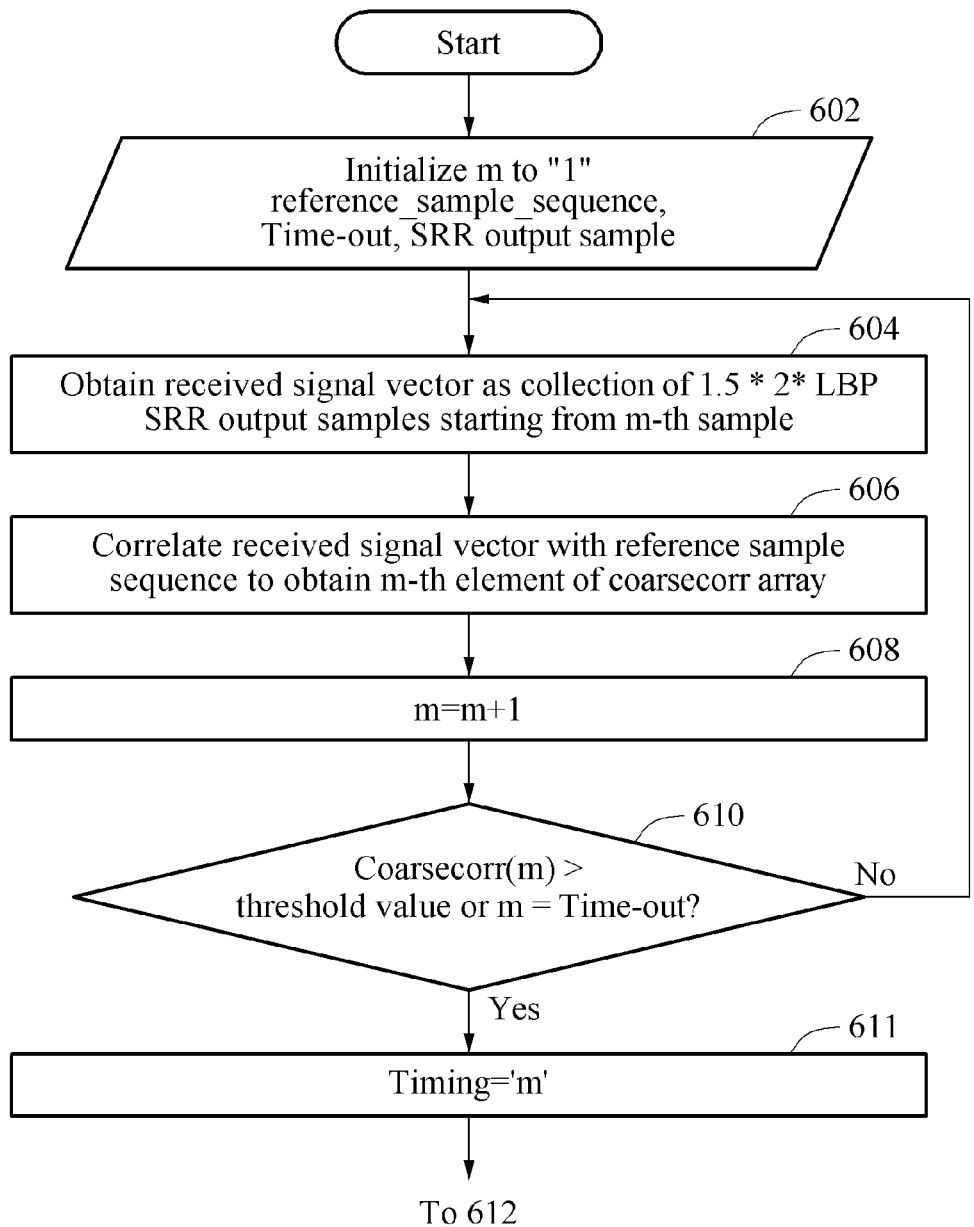

FIGS. 6A and 6B are flowcharts illustrating a more detailed example of a method of performing synchronization and interference rejection in an SRR. FIGS. 6A and 6B illustrate operations of the method 500 in greater detail.

Referring to FIGS. 6A and 6B, in operation 602, the method 500 sets or initializes m to "1", and uses reference_sample_sequence, Time-out, and an SRR output sample as inputs.

In operation 604, the method 500 obtains a received signal vector as a collection of 1.5*2*LBP SRR output samples starting from an m-th sample.

In operation 606, the method 500 correlates the received signal vector with a reference sample sequence to obtain an m-th element of a coarsecorr array.

In operation 608, the method 500 increases m by "1". In operation 610, the method 500 determines whether m=Time-out is satisfied.

If m=Time-out is satisfied or when a correlation value is greater than a threshold value, the method 500 obtains "Timing" in operation 611 according to the following equation.

$$\mathrm{Timing} = \arg\max\{\mathrm{coarsecorr}\}$$

Conversely, if m≠Time-out is satisfied and when the correlation value is not greater than the threshold value, operation 604 is performed.

In operation 612, the method 500 sets q to "1".

In operation 614, the method 500 obtains expected sequences expseq(i,j), i∈{1,2,3} and j∈{0,1} having a length of 1.5*LSF with elements denoted by expseq(i,j)[m], m∈[0, 1, ..., 1.5*LSF−1].

In operation 616, the method 500 computes correlation metrics as described below. Let i denote the sample sequence selected, j represent "0" or "1"', k denote a bit in an SFD sequence, and y denote the received signal vector.

$$\mathrm{corr}(i,j,k) = \Sigma_{m=0}^{LSF-1} \mathrm{expseq}(i,j,m)^* y(m + \mathrm{Timing} + 1.5^* q^* \mathrm{LBP} + 1.5^* k^* \mathrm{LSF}) \ldots, q=1, \ldots, N_{rep},$$
$$i \in \{1,2,3\}, j \in \{0,1\}, k \in \{0,1,\ldots,\mathrm{LSFD}-1\}$$

In operation 618, the method estimates the k-th bit of the SFD sequence for all values of i and k. The estimation is performed as expressed below.

$$\mathrm{SFD}_{est(i,k)} = \begin{cases} 1 & (\mathrm{corr}(i,1,k) > \mathrm{corr}(i,0,k)) \\ 0 & (\text{otherwise}) \end{cases}$$

In operation 620, the method 500 determines whether an SFD sequence is detected by calculating corrSFD as follows, and determining that an SFD sequence is detected when corrSFD for any i is greater than or equal to a threshold value.

$$\mathrm{corrSFD}(i) = \Sigma_{m=0}^{LSFD-1} \mathrm{SFD}_{est(i,m)} * \mathrm{SFD}(m)$$

In operation 622, the method 500 calculates a decision metric as expressed below when corrSFD for any i is greater than or equal to a threshold value, where "~" denotes a one's complement.

$$H(i) = \Sigma_{k=0}^{LSFD-1} \mathrm{SFD}(k)\mathrm{corr}(i,1,k) + \sim\mathrm{SFD}(k)\mathrm{corr}(i,0,k)), i \in \{1,2,3\}, \text{ wherein } i \text{ is an } i \text{ that maximizes } H(i)$$

If the SFD sequence is detected, the method 500 selects a desired sample set i for demodulation in operation 624. Conversely, if the SFD sequence is not detected, the method 500 determines whether $q \geq N_{rep}$ is satisfied in operation 626. If $q \geq N_{rep}$ is satisfied, the method 500 is terminated. Conversely, if $q \geq N_{rep}$ is not satisfied, the method 500 increases q by "1" in operation 628. When q is increased by "1", operation 614 is performed.

The various operations in the method 500 may be performed in the order presented, in a different order, or simultaneously. Further, in some examples, a portion of the operations may be omitted, added, modified, or skipped without departing from the scope of the disclosure.

Figure 7:
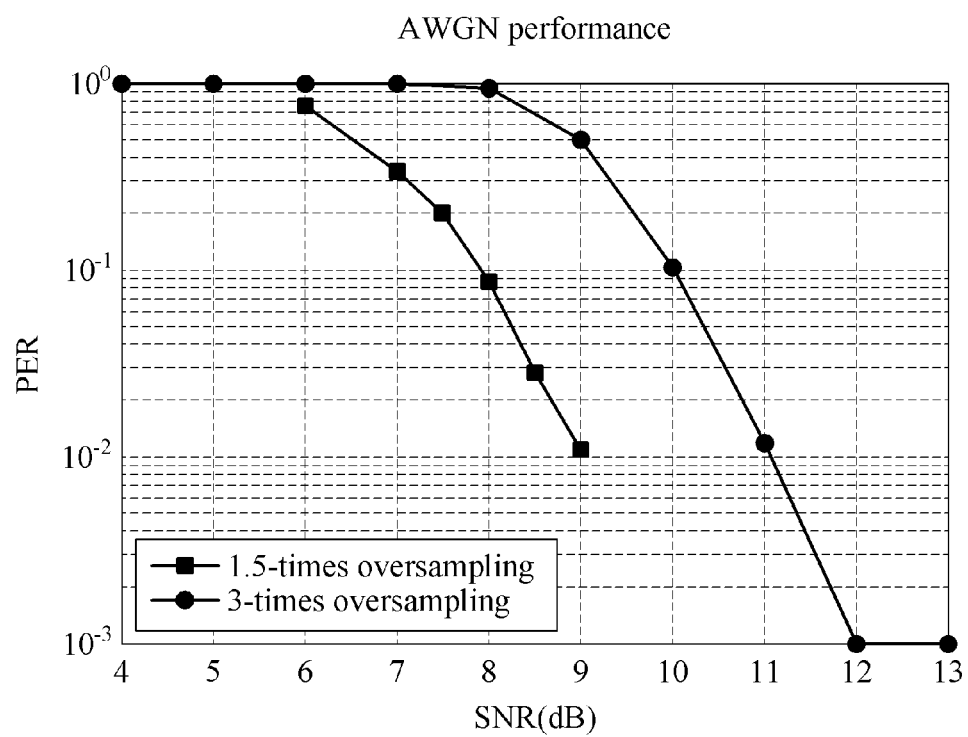
FIG. 7 illustrates an example of a graphical representation of additive white Gaussian noise (AWGN) performance.

FIG. 7 illustrates an example of a graphical representation of additive white Gaussian noise (AWGN) performance for 1.5 times-oversampling, as per the quench rate setting used in the method 500 performed by the system 200, and 3-times oversampling, where "PER" denotes a packet error rate.

Figure 8:
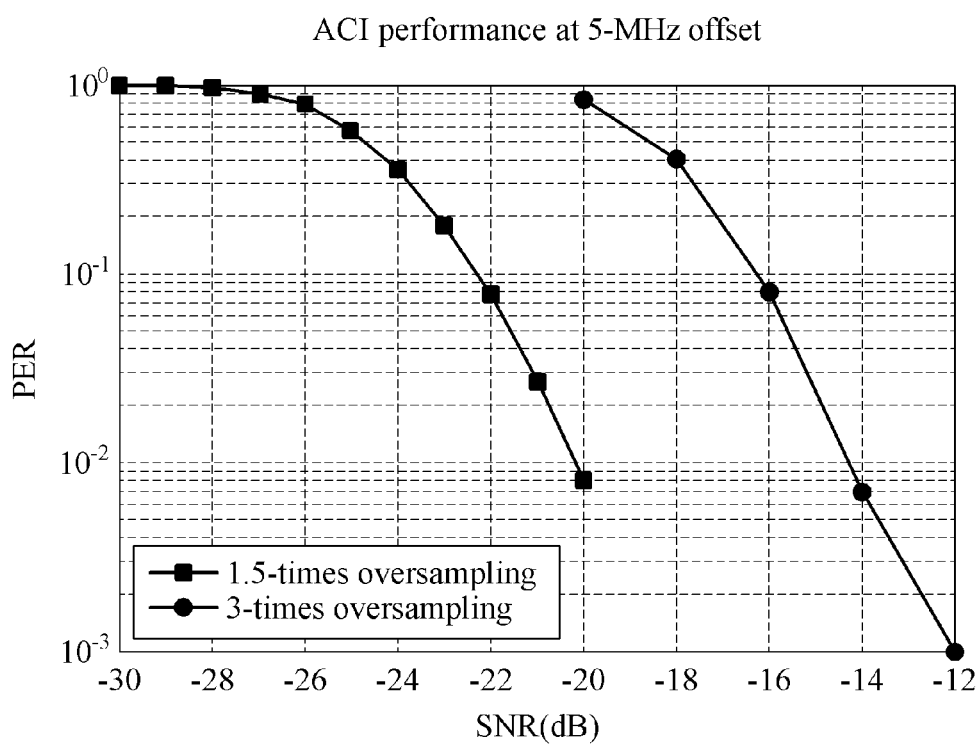
FIG. 8 illustrates an example of a graphical representation of adjacent channel interference (ACI) performance at a 5-megahertz (MHz) offset.

FIG. 8 illustrates an example of a graphical representation of ACI performance at a 5-megahertz (MHz) offset for 1.5-times oversampling, as per the quench rate setting used in the method 500 performed by the system 200, and 3-times oversampling.

Figure 9:
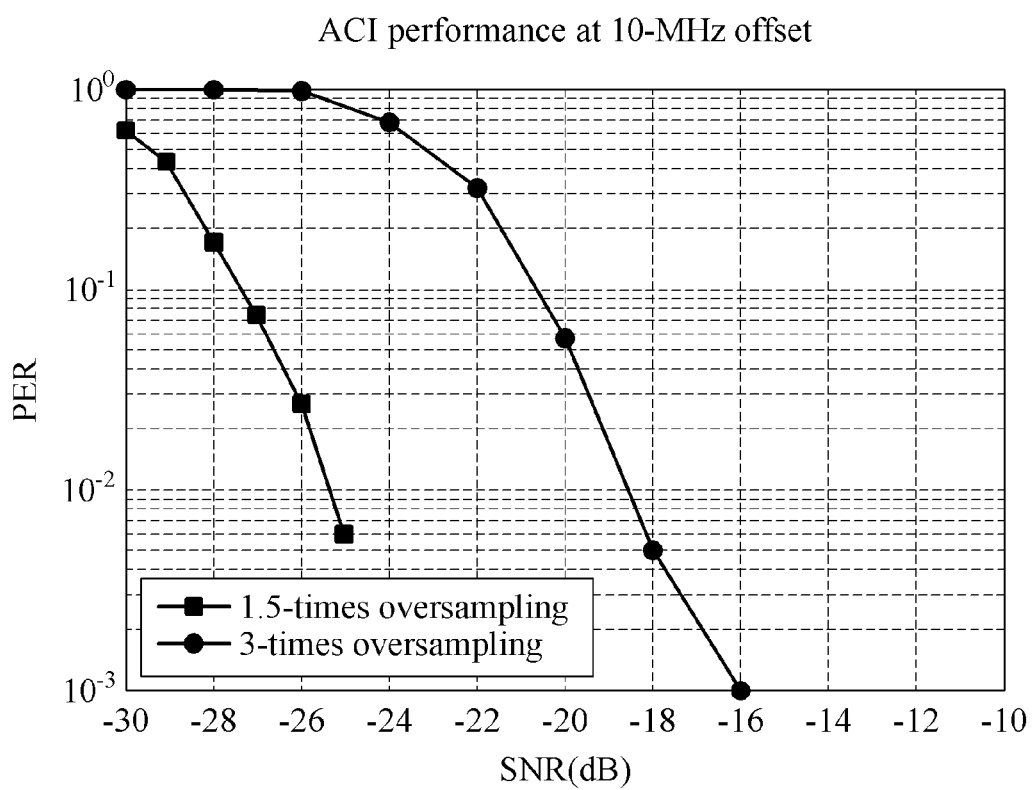
FIG. 9 illustrates an example of a graphical representation of ACI performance at a 10-megahertz (MHz) offset.

FIG. 9 illustrates an example of a graphical representation of ACI performance at a 10-MHz offset for 1.5-times oversampling, as per the quench rate setting used in the method 500 performed by the system 200, and 3-times oversampling.

As can be seen from FIGS. 7-9, the 1.5-times oversampling used in the examples described in this application provides better performance than the 3-times oversampling.

Figure 10:
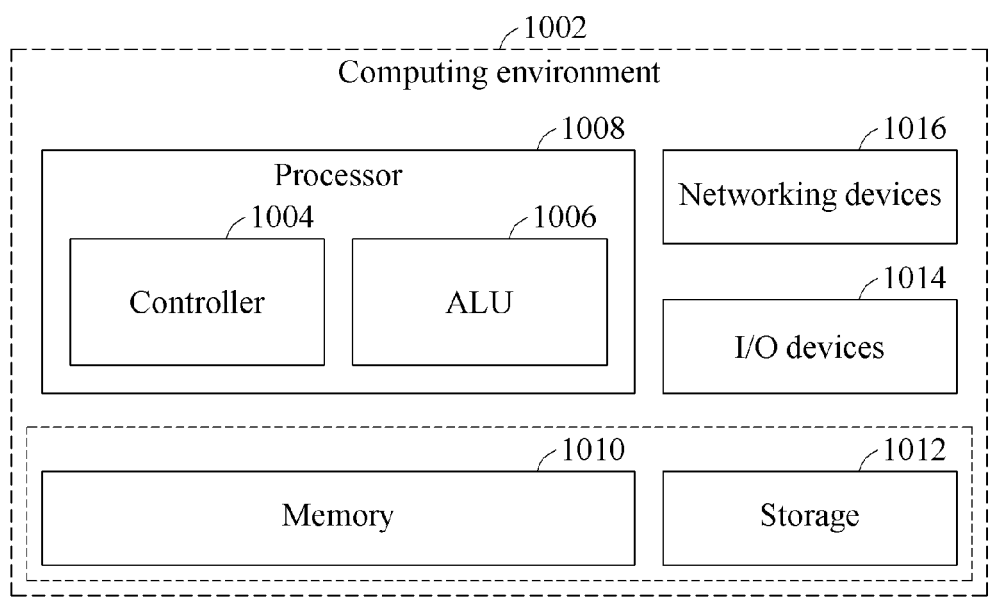
FIG. 10 illustrates an example of a computing environment to implement a method and a system for performing synchronization and interference rejection in an SRR.

FIG. 10 illustrates an example of a computing environment to implement a method and a system for performing synchronization and interference rejection in an SRR. Referring to FIG. 10, a computing environment 1002 includes at least one processor 1008 including a controller 1004 and an arithmetic logic unit (ALU) 1006, a memory 1010, a storage 1012, a plurality of I/O devices 1014, and a plurality of networking devices 1016. The processor 1008 processes instructions of algorithms that cause the processor 1008 to perform the operations described herein. The processor 1008 receives commands from the controller 1004 to process the instructions. Further, logical and arithmetic operations involved in execution of the instructions are computed by the ALU 1006.

The overall computing environment 1002 may include multiple homogeneous and/or heterogeneous cores, multiple CPUs of different types, special media, and accelerators. Further, the at least one processor 1008 may be implemented on a single chip or on multiple chips.

The algorithms including the instructions and code needed to perform the operations described herein are stored in either one or both the memory 1010 and the storage 1012. At the time of execution, the instructions and the code may be fetched from either one or both of the memory 1010 and the storage 1012, and executed by the processor 1008.

The I/O devices 1014 and the networking devices 1016 may be connected to the computing environment 1002 to support implementation of examples described herein through the I/O devices 1014 and the networking devices 1016.

The examples disclosed herein may be implemented by at least one hardware device running at least one software program and performing network management functions to control the elements. The elements shown in FIG. 2 are hardware devices or are implemented by hardware devices running software.

The system 200, the at least one processor 202, the at least one input/output (I/O) interface 204, the memory 206, the setter 208, the acquirer 210, the computer 212, the identifier 214 in FIG. 2 and the computing environment 1002, the at least one processor 1008, the controller 1004, the arithmetic logic unit (ALU) 1006, the memory 1010, the storage 1012, the plurality of I/O devices 1014, and the plurality of networking devices 1016 in FIG. 10 that perform the operations described herein are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 5, 6A, and 6B that perform the operations described herein are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing pulse synchronization in a super regenerative receiver (SRR), the method comprising:
   setting a quench rate of the SRR to a value of 1.5 times a chip rate of an incoming signal;
   acquiring an expected preamble sequence of an arbitrary sample set among a plurality of possible sample sets;
   acquiring an expected start frame delimiter (SFD) sequence for all of the possible sample sets to achieve frame synchronization;
   computing respective correlation metrics for bits of the expected SFD sequence while the expected SFD sequence is acquired for all of the possible sample sets;
   calculating a decision metric based on the correlation metrics in response to an SFD sequence being detected for one or more of the possible sample sets; and
   identifying a best sample set for demodulating the incoming signal among all of the possible sample sets based on the decision metric to achieve pulse synchronization.

2. The method of claim 1, wherein the expected preamble sequence comprises a plurality of base preambles; and
   the method further comprises correlating the incoming signal with the expected preamble sequence at 1.5 times a sampling rate or at 1.5 times the quench rate.

3. The method of claim 2, further comprising obtaining coarse timing synchronization by maximizing a correlation value obtained by the correlating of the incoming signal with the expected preamble sequence.

4. The method of claim 1, wherein detection of the SFD sequence is performed after an integer multiple of a preamble length in the one or more sample sets.

5. The method of claim 1, wherein the computing comprises correlating the acquired expected SFD sequence with each of SFD spread sequences corresponding to "0" and "1" for all of the possible sample sets to obtain the correlation metrics.

6. The method of claim 5, further comprising deciding a received bit as "0" or "1" based on a correlation of an incoming sequence of each of all of the possible sample sets with each of the SFD spread sequences corresponding to "0" and "1".

7. The method of claim 5, further comprising:
   correlating the SFD sequence detected for all of the sample sets with the expected SFD sequence to obtain correlation values; and
   comparing the correlation values with a threshold value.

8. The method of claim 1, wherein the SFD sequence is detected in response to at least one sample set producing at least one correlation value greater than or equal to a threshold value.

9. The method of claim 1, wherein the calculating of the decision metric comprises calculating the decision metric with respect to the best sample set in response to the SFD sequence being detected.

10. The method of claim 9, wherein the calculating of the decision metric further comprises calculating the decision metric based on the correlation metrics and the bits of the expected SFD sequence.

11. The method of claim 1, wherein the identifying of the best sample set comprises identifying, as the best sample set, a sample set that maximizes the decision metric among all of the possible sample sets.

12. A non-transitory computer-readable storage medium storing instructions that, when executed by a processor, cause the processor to perform the method of claim 1.

13. A system for performing pulse synchronization in a super regenerative receiver (SRR), the system comprising:
a processor; and
a memory coupled to the processor and configured to store instructions that, when executed by the processor, cause the processor to implement a setter, an acquirer, a computer, and an identifier;
wherein the setter is configured to set a quench rate of the SRR to a value of 1.5 times a chip rate of an incoming signal;
the acquirer is configured to acquire an expected preamble sequence of an arbitrary sample set among a plurality of possible sample sets, and acquire an expected start frame delimiter (SFD) sequence for of the all possible sample sets to achieve frame synchronization;
the computer is configured to compute respective correlation metrics for bits of the expected SFD sequence while the expected SFD sequence is acquired for all of the possible sample sets, and calculate a decision metric based on the correlation metrics in response to an SFD sequence being detected for one or more of the possible sample sets; and
the identifier is configured to identify a best sample set for demodulating the incoming signal among all of the possible sample sets based on the decision metric to achieve pulse synchronization.

14. The system of claim 13, wherein the expected preamble sequence comprises a plurality of base preambles; and
the computer is further configured to correlate the incoming signal with the expected preamble sequence at 1.5 times a sampling rate or at 1.5 times the quench rate.

15. The system of claim 14, wherein the computer is further configured to obtain coarse timing synchronization by maximizing a correlation value obtained by the correlating of the incoming signal with the expected preamble sequence.

16. The system of claim 13, wherein detection of the SFD sequence is performed after an integer multiple of a preamble length in the one or more sample sets.

17. The system of claim 13, wherein the computer is further configured to correlate the acquired expected SFD sequence with each of SFD spread sequences corresponding to "0" and "1" for all of the possible sample sets to obtain the correlation metrics.

18. The system of claim 17, wherein the computer is further configured to decide a received bit as "0" or "1" based on a correlation of an incoming sequence of each of all of the possible sample sets with each of the SFD spread sequences corresponding to "0" and "1".

19. The system of claim 13, wherein the SFD sequence is detected in response to at least one sample set producing at least one correlation value greater than or equal to a threshold value.

20. The system of claim 13, wherein the computer is further configured to calculate the decision metric based on the correlation metrics and the bits of the expected SFD sequence.

* * * * *